(12) United States Patent
Barish

(10) Patent No.: US 12,705,450 B2
(45) Date of Patent: Aug. 11, 2026

(54) SYSTEMS AND METHODS FOR ENCODING HARDWARE-CALCULATED METADATA INTO RAW IMAGES FOR TRANSFER AND STORAGE AND IMAGING DEVICES

(71) Applicant: ZEBRA TECHNOLOGIES CORPORATION, Lincolnshire, IL (US)

(72) Inventor: Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 441 days.

(21) Appl. No.: 17/853,696

(22) Filed: Jun. 29, 2022

(65) Prior Publication Data

US 2024/0005117 A1 Jan. 4, 2024

(51) Int. Cl.
*G06T 9/00* (2006.01)
*G06K 7/14* (2006.01)

(52) U.S. Cl.
CPC .............. *G06K 7/1495* (2013.01); *G06T 9/00* (2013.01)

(58) Field of Classification Search
CPC ................................ G06K 7/1495; G06T 9/00
See application file for complete search history.

(56) References Cited

U.S. PATENT DOCUMENTS 10,158,840 B2 * 12/2018 Mishra .................. H04N 13/15
2016/0241829 A1 * 8/2016 Qu .......................... G09G 5/10
2016/0373722 A1 * 12/2016 Mishra ............... H04N 1/32309
2018/0027174 A1 * 1/2018 Sengoku ................ H04N 23/73 348/207.11
2018/0075033 A1 * 3/2018 Estok ................. G11B 27/3027
2019/0065799 A1 * 2/2019 Santi ................ G06K 19/06037
2019/0266107 A1 * 8/2019 Murphy .............. G06F 11/1004
2022/0012329 A1 * 1/2022 Boling .................. G06F 21/577
2022/0114761 A1 * 4/2022 Wictorin, III .......... H04N 19/60

OTHER PUBLICATIONS

Lee et al, A data hiding method based on information sharing via PNG images for applications of color image authentication and metadata embedding, 2013, Signal Processing 93(2013) 2010-2025. (Year: 2013).*
Mobasseri et al, Data Embedding in JPEG Bitstream by Code Mapping, 2009, IEEE Transactions on Image Processing 19(4): 958-966. (Year: 2009).*
Hill et al, Embedding metadata in images at time of capture using physical Quick Response (QR) codes, 2021, Information Processing and Management 58(2021):1-13. (Year: 2021).*
International Search Report and Written Opinion for International Application No. PCT/US2023/17585 mailed on Jun. 22, 2023.

* cited by examiner

*Primary Examiner* — Kathleen M Broughton

(57) ABSTRACT

Systems and methods for encoding metadata in image data captured by an imaging device, such as a barcode device or machine vision device, are provided. An example method includes analyzing raw image data at a front-end applicant specific integrated circuit to determine image metadata for each of a plurality of different pixel groupings collectively forming the raw image data. A least significant bit process is then used to encode the metadata into the image data, in a manner visually hidden from a user. A host processor receives the encoded image data, decodes the image metadata and uses that to process the image data, for example, performing barcode decoding or machine vision processes.

25 Claims, 7 Drawing Sheets

SYSTEMS AND METHODS FOR ENCODING HARDWARE-CALCULATED METADATA INTO RAW IMAGES FOR TRANSFER AND STORAGE AND IMAGING DEVICES

BACKGROUND

Solid-state imaging devices have been used in barcode imaging applications, machine vision applications, and others. In various implementations, these imaging devices are configured with a scan engine used to capture images and compute various image metrics very efficiently. In some devices, the barcode decoding is performed directly on the scan engine. However, in many devices the scan engine captures images and sends send those captured images to a main processor where image processing occurs. In such configurations, the main processor performs the key image processing, which may include indicia identification and decoding, object identification, and/or other processing intensive functions. However, because the image metrics are computed on the scan engine, the image metrics are not natively available to the main processor, as only the captured image is transferred. Nevertheless, depending on the image metrics, if the main the processor had such data, the main processor could be designed such that its operations, e.g., decoding, are performed even faster than currently performed.

Conventional techniques for appending image metrics to captured image data are sub-optimal. Low-resolution scan engines (e.g., 1 megapixel), for example, merely append the image metrics to the end of the image data, either to a bottom series of rows of the two-dimensional array image data or to outer edge columns of that image data. Appending image metrics is this manner does not scale to higher-resolution engines, as the larger resultant image data size would hinder frame rates and slow overall operation of the imaging device, including the operations of the host processor. Additionally, appending image metrics to ends of the image data alters the image presented to the user and saved to the device. The appended image metrics results in an image with visible binary data, which is undesirable. That is to say, since when the captured images may be shown to a user, saved to disk, saved to a file transfer protocol (FTP) server, etc., the images will have a block of binary image metrics data visible to users, which is undesirable. Further, for higher-resolution scan engines (e.g., 2-megapixel, 5-megapixel, and higher images), adding extra columns of data or rows data would not be practical, as it would result in the image becoming very large and taking a longer time to transmit from the engine to processor, resulting in a lower effective frame rate.

Accordingly, there is a need for systems and methods for encoding image metrics calculated at a front end into raw image data for transfer to and storage in a host processing environment to improve operations of imaging devices.

SUMMARY

In an embodiment, the present invention is a method for encoding image metadata in image data. The method may comprise: capturing, by an imaging device, image data corresponding to an image of environment captured over a field of view of the imaging device; analyzing, on an imaging device processor of the imaging device, the image data and determining, on the imaging device processor, image metadata of a plurality of pixel groupings over the captured image, the image metadata comprising a plurality of image metadata words each representing image metadata for a different pixel grouping; encoding, on the imaging device processor, each of the image metadata words into least significant bits of pixel data in the image data to generate an encoded image data; transmitting the encoded image data, from the imaging device processor to a host processor, the host processor applying a least significant bit decoding process to decode the image metadata, the host processor further using that image metadata to process the image data.

In a variation of this embodiment, the method further comprises in the host processor device, identifying indicia in the image data and, using the image metadata, decoding the indicia and generating decode data corresponding to the indicia.

In a variation of this embodiment, the method further comprises in the host processor device, using the image metadata, identifying in the image data one or more objects, one or more object defects, contrast data, brightness data, pixel count, or a combination thereof.

In a variation of this embodiment, the image metadata determined at the imaging device processor is maximum pixel intensity data over the respective pixel grouping, minimum pixel intensity data over the respective pixel grouping, pixel intensity range data over the respective pixel grouping, directional pixel data over the respective pixel grouping, or any combination thereof.

In a variation of this embodiment, the pixel groupings are 8 pixel by 8 pixel groupings is size or larger.

In a variation of this embodiment, the imaging device comprises a grayscale imager and the image data is grayscale image data and the image metadata words are single channel words.

In a variation of this embodiment, the imaging device comprises a color imager and the image data is color image data and the image metadata words are multiple channel words.

In a variation of this embodiment, the method further comprises analyzing, on the imaging device processor of the imaging device, the captured image and determining, on the imaging device processor, tagline metadata for the entire image data; and appending, at the imaging device processor, the tagline metadata after the image data, to form an encoded image data appended with the tagline metadata.

In a variation of this embodiment, the method further comprises adding, at the imaging device processor, encode flag data to the image data such that the encoded image data contains the encode flag data; and the host processor selectively decoding the image metadata in response to detecting the encode flag data.

In yet another embodiment, the present invention is a device for encoding image metadata into image data captured by an imaging device. The device may comprise: an imaging device processor and a second processor operatively coupled to the first process through a communication link; and a non-transitory computer-readable memory coupled to the imaging apparatus and the first or second processors, the memory storing instructions thereon that, when executed by the first and second processors, cause the first and second processors to: capture, by an imaging device, image data corresponding to an image of scene captured over a field of view of the imaging device; analyze, on the imaging device processor, the image data and determine, on the imaging device processor, image metadata of a plurality of pixel groupings over the captured image, the image metadata comprising a plurality of image metadata words each representing image metadata for a different pixel grouping; encode, on the imaging device processor, each of the image metadata words into least significant bits of pixel data in the image data to generate an encoded image data; transmit the encoded image data, from the first process to the second processor; apply, at the second processor, a least significant bit decoding process to decode the image metadata; and at the second processor, process the image data, using the decoded image metadata.

In a variation of this embodiment, the second processor is a host processor is configured to identify indicia in the image data and decoded the indicia and generate decode data corresponding to the indicia, identify in the image data one or more objects, identify in the image data one or more object defects, determine contrast data, determine brightness data, determine pixel count, or a combination thereof.

In a variation of this embodiment, the image metadata determined at the imaging device processor is maximum pixel intensity data over the respective pixel grouping, minimum pixel intensity data over the respective pixel grouping, pixel intensity range data over the respective pixel grouping, directional pixel data over the respective pixel grouping, or any combination thereof.

In a variation of this embodiment, the pixel groupings are 8 pixel by 8 pixel groupings is size or larger.

In a variation of this embodiment, the imaging device comprises a grayscale imager and the image data is grayscale image data and the image metadata words are single channel words.

In a variation of this embodiment, the imaging device comprises a color imager and the image data is color image data and the image metadata words are multiple channel words.

In an variation of this embodiment, the non-transitory computer-readable memory storing further instructions thereon that, when executed by the first and second processors, cause the first and second processors to: analyze, on the imaging device processor, the image data and determine, on the imaging device processor, tagline metadata for the entire image data; and append, on the imaging device processor, the tagline metadata after all the pixel data of the image data, to form an encoded image data appended with the tagline metadata.

In an variation of this embodiment, the non-transitory computer-readable memory storing further instructions thereon that, when executed by the first and second processors, cause the first and second processors to: add, on the imaging device processor, encode flag data to the image data such that the encoded image data contains the encode flag data; and at the second processor, selectively decode the image metadata in response to detecting the encode flag data.

In another embodiment, the present invention is a system for encoding image metadata into image data, the device comprising. The system may comprise: an imaging device configured to capture image data over a field of view of an imager; and a imaging device processor at a front end of the imaging device and communicatively coupled to a host processor through a communication link, wherein the imaging device processor is configured to: analyze the image data and determine image metadata of a plurality of pixel groupings over the image data, the image metadata comprising a plurality of image metadata words each representing image metadata for a different pixel grouping; encode each of the image metadata words into least significant bits of pixel data in the image data to generate an encoded image data; and transmit the encoded image data to the host processor over the communication link; and wherein the host processor is configured to: apply a least significant bit decoding process and decode the image metadata; and process the image data using the decoded image metadata.

In a variation of this embodiment, the host processor is configured to identify indicia in the image data and decoded the indicia and generate decode data corresponding to the indicia, identify in the image data one or more objects, identify in the image data one or more object defects, determine contrast data, determine brightness data, determine pixel count, or a combination thereof.

In a variation of this embodiment, the image metadata determined at the imaging device processor is maximum pixel intensity data over the respective pixel grouping, minimum pixel intensity data over the respective pixel grouping, pixel intensity range data over the respective pixel grouping, directional pixel data over the respective pixel grouping, or any combination thereof.

In a variation of this embodiment, the pixel groupings are 8 pixel by 8 pixel groupings is size or larger.

In a variation of this embodiment, the imaging device comprises a grayscale imager and the image data is grayscale image data and the image metadata words are single channel words.

In a variation of this embodiment, the imaging device comprises a color imager and the image data is color image data and the image metadata words are multiple channel words.

In a variation of this embodiment, the imaging device processor is configured to: analyze the image data and determine tagline metadata for the entire image data; and append the tagline metadata after the all pixel data of the image data, to form an encoded image data appended with the tagline metadata.

In a variation of this embodiment, the imaging device processor is configured to add encode flag data to the image data such that the encoded image data contains the encode flag data; and wherein the host processor is configured to selectively decode the image metadata in response to detecting the encode flag data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
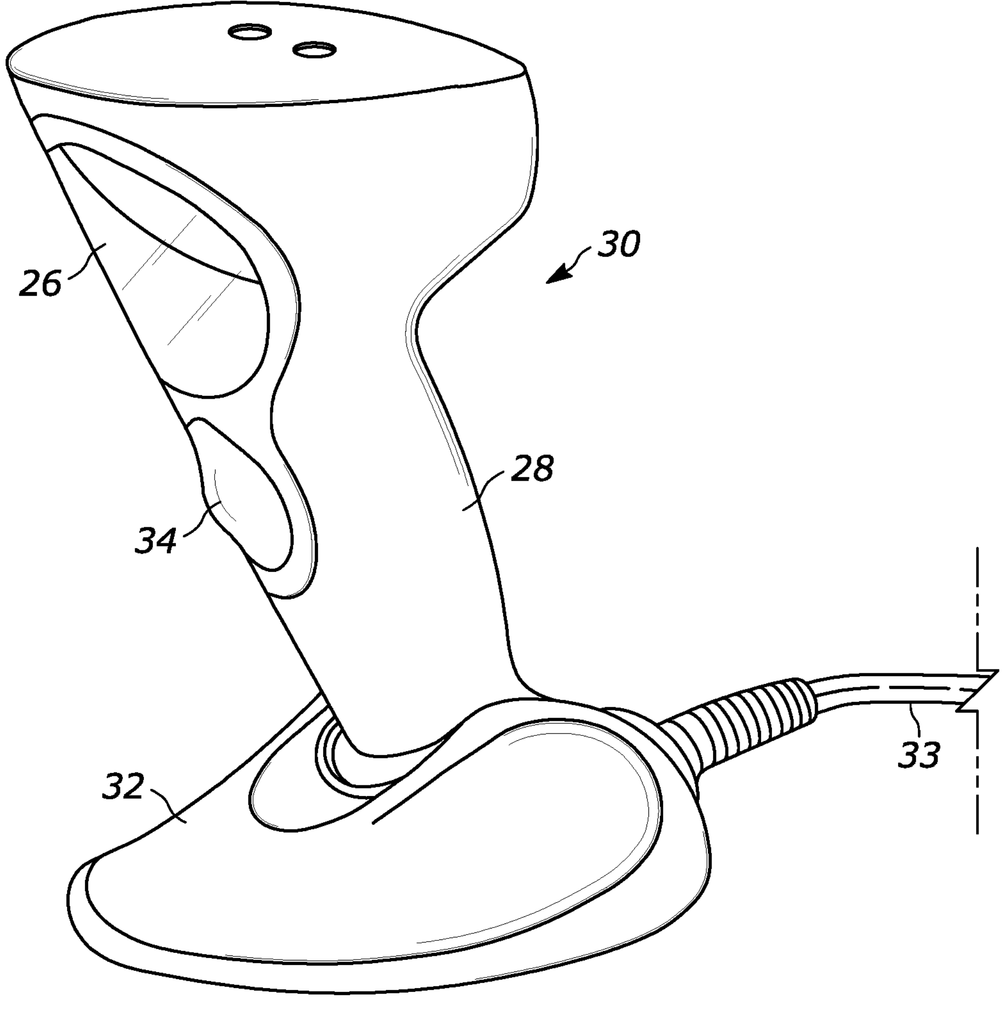
FIG. 1 is a perspective view of a portable imaging device in the form a barcode imaging device, operative in either a handheld mode, or a hands-free mode, for capturing return light from targets, in accordance with an example.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, conventionally, imaging devices are configured with a scan engine used to capture image, where, in some examples, that scan engine further computes various image metrics. In these later examples, the scan engines send the captured images to a main processor for processing, which identifies and decodes indicia in the captured images. Conventional techniques for appending image metrics to captured image data are sub-optimal. They involve appending the image metrics to the end of the image data, either to a bottom series of rows of the two-dimensional array of pixel data or to outer edge columns of that pixel data. However, such techniques do not scale well to higher-resolution engines, hindering frame rates and slowing processing at the host processor. They also result in an affected image where the image data presented to the user visually shows the appended binary data.

Thus, it is an objective of the present disclosure to eliminate these and other problems with conventional imaging devices by providing systems and methods to encode image metadata into the image data in a manner invisible to the user and without increasing the image size. For example, the present disclosure provides novel approaches of using steganography, i.e., hiding metadata in image data, for transporting image metadata computed on frontend hardware, such as on low-level specialized hardware, to backend or higher-level processors, for processing. In various embodiments, image metadata is encoded in image data such that the metadata is invisible to users, for example, using a steganographic process. In particular, in various embodiments an encoding scheme is applied at a front end processor that segments the image data into a plurality of pixel groupings and determines image metadata for each of these pixel groupings, generating a plurality of different image metadata words, one for each pixel grouping. In various embodiments, the front end processor is configured to encode these image metadata words into the least significant bits of the pixel data in the image data. This process results in an image that is visually indistinguishable from the original, but that is nonetheless encoded with image metadata that is transmitted to the back end or host processor.

FIG. 1 illustrates an example imaging device configured to implement various processes and methods described herein. In particular, FIG. 1 illustrates a portable imaging device 30 capable of decoding a barcode or other indicia and that includes a generally upright window 26 and a handle-shaped housing 28 supported by a base 32, for example, for supporting the imaging device 30 on a flat surface, such as a tabletop. The imaging device 30 may be operated in handheld mode or in a hands-free mode, e.g., where the imaging device 30 is positioned on the flat surface and operates as a stationary workstation in which targets are slid, swiped past, or presented to, the window 26. In the handheld mode, the housing 28 may be held in an operator's hand in which the imaging device 30 is moved, and a trigger 34 is manually depressed by the operator to initiate imaging of targets, especially one- or two-dimensional barcodes, and/or other indicia, located at, or at a distance from, the window 26. In other implementations, the base 32 may be omitted, and housings of other configurations can be employed. The imaging device 30 is configured to capture image data of a target, in particular image data of encoded barcode or other indicia on a target 38 (shown in FIG. 2). The captured imaging data may be communicated to connected devices through a wired connection 33, while in other examples, the imaging device 30 includes a wireless transceiver for communicating image data through a wireless link or wireless network.

Figure 2:
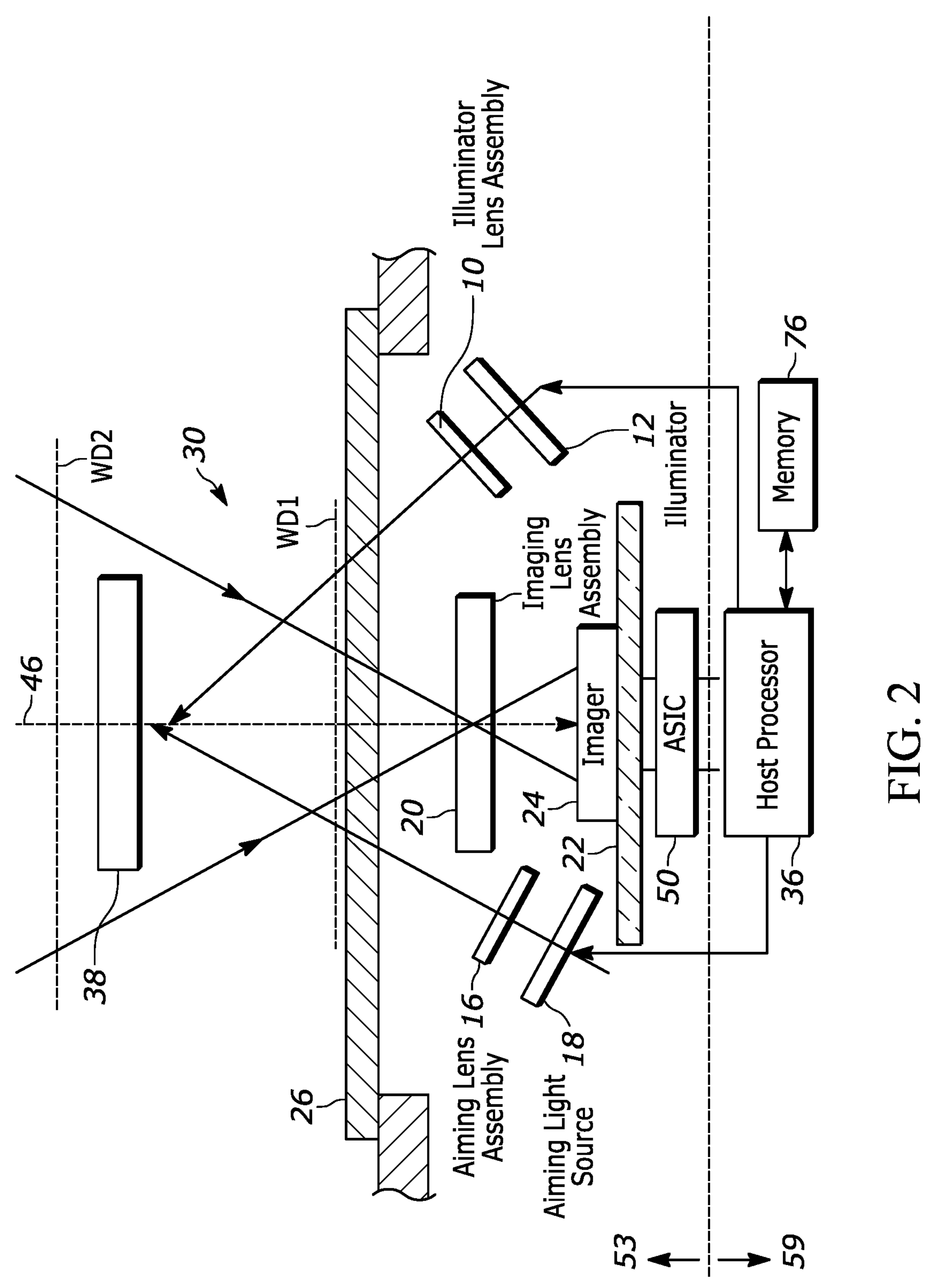
FIG. 2 is a schematic diagram of various components of the portable imaging device of FIG. 1 showing a front-end application specific integrated circuit (ASIC) and a back-end host processor, in accordance with an example.

As shown in FIG. 2, an imager 24, such as a barcode imager, is mounted on a printed circuit board 22 in the imaging device 30. The imager 24 is a solid-state device, for example, a charged coupled device (CCD) image or a complementary metal-oxide-semiconductor (CMOS) imager having a one-dimensional array of addressable image sensors or pixels arranged in a single, linear row, or a two-dimensional array of such sensors arranged in mutually orthogonal rows and columns, and operative for detecting return light captured by an imaging lens assembly 20 along an optical path or axis 46 through the window 26. The return light is scattered and/or reflected from the target 38 as pixel data over a two-dimensional field of view.

The imager 24 may include electrical circuitry having a settable gain for converting the pixel data to analog electrical signals, and a digitizer for digitizing the analog signals to digitized electrical signals or image data. The imaging lens assembly 20 may be operative for adjustably focusing the return light at a settable focal length onto the array of image sensors to enable the target 38 to be read. The target 38 may be located anywhere in a working range of distances between a close-in working distance (WD1) and a far-out working distance (WD2). In a preferred embodiment, WD1 is about four to six inches from the imager 24, and WD2 can be many feet from the window 26, for example, around fifty feet away.

An illuminating assembly is also mounted in the imaging device 30 and preferably includes an illuminator or illuminating light source 12, e.g., a light emitting diode (LED) or a laser, and an illuminating lens assembly 10 to uniformly illuminate the target 38 with an illuminating light having a settable intensity level over a settable illumination time period. The light source 12 is preferably a pulsed light source.

An aiming assembly is mounted in the imaging device 30 and, in the illustrated example, includes an aiming light source 18, e.g., a light emitting diode (LED) or a laser, for emitting an aiming light with a settable intensity level over a settable illumination time period, and an aiming lens assembly 16 for generating a visible aiming light pattern from the aiming light on the target 38. The aiming pattern is useful to help the operator accurately aim the reader at the target 38.

As shown in FIG. 2, the illuminating light source 12 and the aiming light source 18 are operatively connected to a controller or host processor 36 operative for decoding a barcode present on the object 38. In some embodiments, the host processor 36 is further operative to control operation of components of the imaging device 30.

The imager 24 is operatively connected to the host processor 36 via an imaging device processor, which in the illustrated example is an application specific integrated circuit (ASIC) 50. The imaging device processor refers to processor located on the imaging device. A local memory 76 is accessible by the host processor 36 for storing and retrieving data.

In an example of controlling operation of the imaging device 30, the host processor 36 is configured to send command signals to energize the aiming light source 18 prior to image capture, to pulse the illuminating light source 12 for the illumination time period, e.g., at 500 microseconds or less, and to energize and expose the imager 24 to collect light, e.g., illumination light and/or ambient light, from the target during an exposure time period. In an example, the array of the imager 24 acquires the target images and operates at a frame rate of about 30-60 frames per second.

Figure 3:
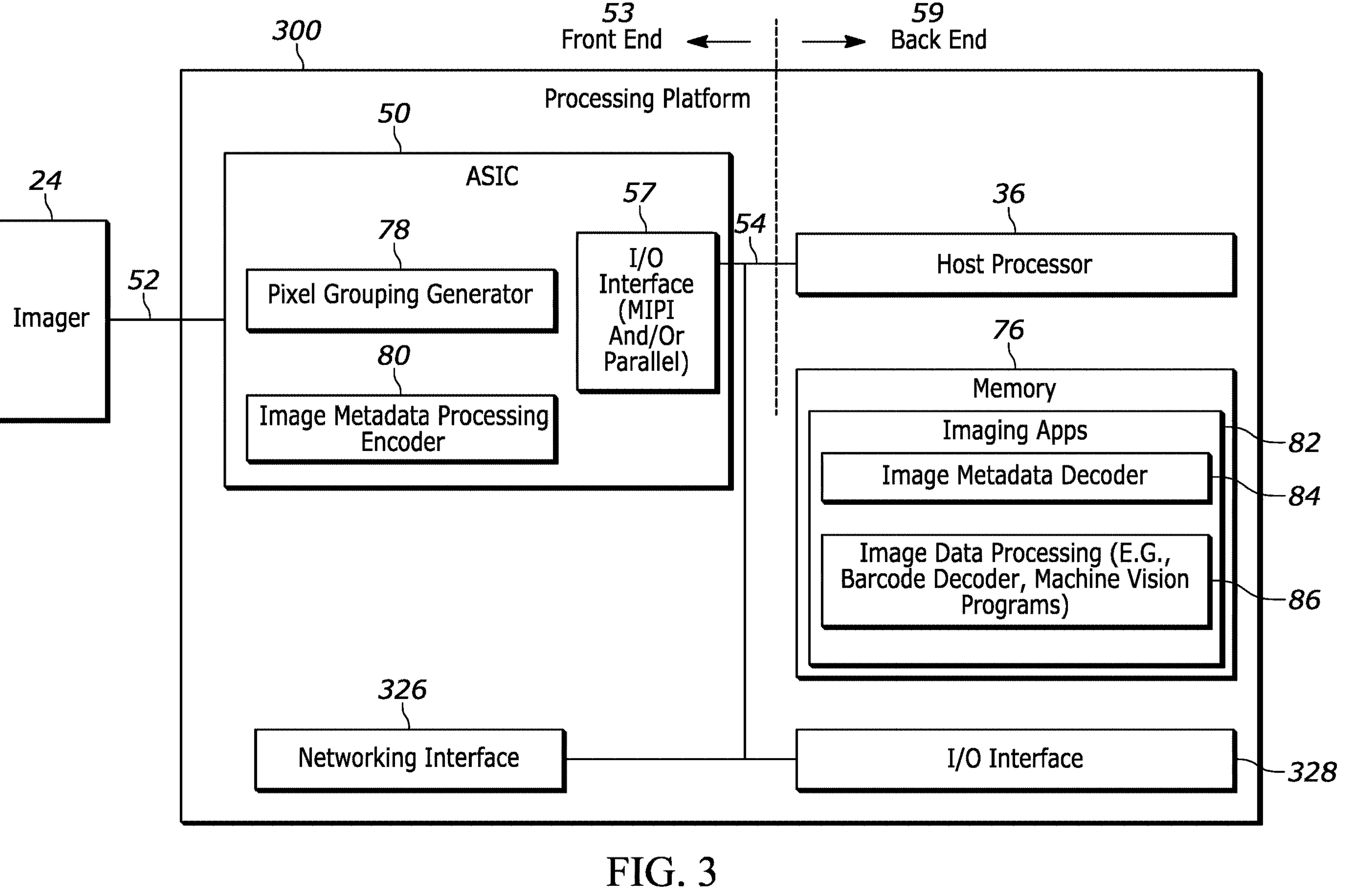
FIG. 3 is a schematic of an example of the dedicated front-end ASIC and the back-end host processor of FIG. 2, in accordance with an example.

To facilitate encoding image metadata in image data, the ASIC 50 and host processor 36 may be implemented as processing platform 300, shown in FIG. 3 which is block diagram representative of an example logic circuit capable of implementing example methods and/or operations described herein. The ASIC 50 is operatively connected to the imager 24 via an image data bus 52 over which image data captured by the imager 24 is transmitted to the ASIC 50, e.g., where that image data corresponds to an image of an environment captured over a field of view of that imager. The ASIC 50 is connected to the host processor via a system bus 54 over which that image data is transmitted for the host processor 36 to process the image data. Further, in accordance with various processes and methods here, the ASIC 50 determines image metadata that may also be transmitted to the host processor over the system bus 54, for the host processor 36 to process the received image data using the received image metadata from the ASIC 50. The system bus 54 may represent any communication link between the ASIC 50 and the host processor 36, including for example an inter-integrated circuit bus. Further, while the processing platform 300 is described as having an ASIC and host processor, more generally, the techniques herein throughout the disclosure may be implemented on a processing platform that uses an imaging device processor or other front-end processor at the imaging device for image metadata determinations and uses a back-end or second processor for image data analysis.

In some examples, the image data received at the image ASIC 50 is raw image data from the imager 24 and that raw image data is encoded and transmitted to the host processor 36, without performing any preliminary image processing such as image/pixel smoothing, signal-to-noise ratio processing, image contrast processing, etc. Such imaging processing may be avoided resulting in less processing intensive operations at the ASIC 50. In some examples, the raw image data from the imager 24 is converted to a rendition of the raw image data before encoding with the image metadata, and then the rendition of the raw image data is configured with the encoded image metadata to form the encoded image data. In some examples, these renditions may be reduced resolution renditions of the original raw image data received from the imager 24. Reduced resolution renditions of an image may be useful to allow for quick display of image data to an operator using a display on the imaging device 30 or some other display, where high image resolution is not necessary.

By having the ASIC 50 entirely on the front-end processing side 53, much faster processing of the image data, decoding of symbols, and embedding of decode data and image data may be performed. By further configuring the ASIC 50 to produce renditions of that image data, including for example from the raw image data, such decoding and embedding processing may be increased even further. The result, in some implementations, is that the display 68 of the imaging reader 30 may display a rendition of the image data to a user along with decode data that the host processor 36 has assessed to determine and display the underlying product data associated with that decode data. The operator may then quickly assess, at the imaging reader 30, what image data has been captured, what barcode has been captured, and product data associated with that barcode, from which the operator can quickly assess with the scan of the image reader 30 was accurate.

In the illustrated example, the ASIC 50 is operatively connected to the host processor 36 through an Input/Output interface 57. The ASIC 50 may receive some capture data from the host processor 36, e.g., over the system bus 54 operatively connected to the ASIC 50 via the I/O interface 57, which may be implemented as a mobile industry processor interface (MIPI) I/O interface.

In the illustrated example, processing on the imaging reader 30 is segmented into a front-end processing side 53 and a host processing side 59 each operatively connected to one another through the I/O interface 57. The host processor 36 may transmit processed image data and control commands from the host processing side 59 to the front-end processing side 53 through the I/O interface 57, while the ASIC 50 may transmit image data and image metadata to the host processor 36 via the I/O interface 57. In an example, the buses 52 and 54 are bi-directional, as well may be another bus (not shown) operatively connecting the host processor 36 to various sub-systems of the imaging reader, including a WiFi transceiver subsystem, a near field communication (NFC) sub-system, a Bluetooth sub-system, a display, series of applications (apps) stored in a app memory sub-system, a power supply providing power to the imaging reader 30, and a microphone and speaker sub-system.

In the processing platform 300, the ASIC 50 is configured to include a pixel grouping generator 78 that may perform initial processing on the received image data, in accordance with examples herein. Further, the pixel grouping generator 78 is configured to generate, from the received image data, a plurality pixel groupings. These pixel groupings may be equal in shape and size and collectively cover the entire image data. For example, these pixel groupings may be N pixel×N pixel squares, where N is great than 1, for example, 2 pixel×2 pixel squares, 4 pixel×4 pixel squares, 8 pixel×8 pixel squares, or larger. In some examples, the pixel groupings may cover only a predetermined region of the entire image data. The pixel grouping generator 78 generates the pixel groupings and sends them to an image metadata processing encoder 80 configured to determine, for each of the pixel groupings, image metadata, which the encoder 80 may temporarily store as a plurality of different image metadata words. In the example of a 8 pixel×8 pixel squares, the image metadata words may be 1 byte, i.e., 8 bits, in length.

The types of image metadata identified by the processing encoder 80 may vary depending on the application of use of the imaging device and/or the type of imaging device. Example image metadata determined for each pixel grouping includes a maximum pixel intensity data over the pixel grouping, a minimum pixel intensity data over the pixel grouping, pixel intensity range data indicating the range of pixel intensity values from maximum to minimum over the pixel grouping, directional pixel data for the pixel grouping, or any combination thereof. In various examples, the image metadata determined by the processing encoder 80 is metadata that will improve operation of the host processor, in particular image data processing operations performed at the host processor. In examples, there the host processor executes processes to decode a barcode or other indicia in image data, image metadata such as maximum and/or minimum pixel intensity can reduce processing time on the host processor.

The processing encoder 80 generates an image metadata word containing the image metadata determined for each respective pixel grouping. In various examples, the imager 24 is a grayscale imager, in which, in various examples, the image metadata word is a single channel word, e.g., a single 8 bit (1 byte) word. The imager 24, of course, could be a color imager, in which case the image metadata word may be a multi-channel word, generated for each pixel grouping. For example, a multi-channel word might have an 8 bit word for a red (R) pixel channel, another 8 bit word for a blue (B) channel, and another 8 bit word for green (G) channel. In some examples, a further channel may be included for overall pixel intensity, for example. In any case, the processing encoder 80 is configured with one or more image metadata criteria that are used to determine the image metadata for each pixel grouping, where the size and/or number of channels in the word are determined by the encoder 80.

Further, the processing encoder 80 encodes the image metadata words into the image data using an encoding protocol, in particular a steganographic protocol and more, in particular, a least significant bit encoding protocol that embeds the image metadata into the image data generating an encode image data, advantageously without increasing the file size of the image data and without visually displaying the image metadata to a user who displays the image data on a display. As used herein, a steganographic protocol or process refers to one that embeds image metadata into image data in a hidden manner, such that a user cannot identify the image metadata from merely looking at a display of the pixels forming the image data, thereby making the image metadata visually undetectable. While the pixel grouping generator 78 and the metadata processing encoder 80 are shown as within the ASIC 50, in some examples, the front-end processor may be implemented in a co-processing configuration. For example, in some legacy examples an existing ASIC that is configured without one or more of the generator 78 and the processing encoder 80 may be communicatively coupled to co-processing ASIC (or other front-end processor) to perform the operations of one or both of the pixel grouping generator and the metadata processing encoder to generate the encoded image data which is then sent to a back-end host processor for processing as described.

To facilitate decoding the encoded image data at the host processor 36, a memory 76 includes imaging applications 82 that include an image metadata decoder app 84 and an image data processing 86. Executing, the image metadata decoder app 84, the host processor receives the encoded image data from the ASIC 50 and determines if the image data has been encoded, for example, by searching for encode flag data in the image data. If, the host processor determines that the image data has been encoded, the decode app 84 applies a least significant bit decoding process to decode the image metadata. In an example, the least significant bits from all the pixel data in the encoded image data are used to reconstruct image metadata words, as a part of the decoding process. The image data processing app 86 uses the decoded image metadata in processing the image data, for example, by optimizing decoding parameters of the processing app 86 based on the image metadata. For example, in various embodiments where the imaging device 30 is a barcode imaging device, the processing app 86 may be configured to use the image metadata to more efficiently identify indicia in the image data and decode that indicia to generated decode data corresponding to the indicia. By contrast, in various embodiments where the imaging device 30 is a machine vision device, the processing app 86 may be configured to use the image metadata to identify one or more objects in the image data, one or more defects in identified objects, the presence or absence of particular objects in the image data, distances between identified objects in the image data, contrast data, brightness data, pixel count, or a combination thereof.

Thus, in various embodiments, the host processor 36 executes the image data processing app 86 to identify one or more barcodes (or other indicia) in the image data, using the decoded image metadata from the decoder app 84. The image data processing app 86 may be configured to decode the identified indicia, whether the indicia are one-dimensional (1D) or two-dimensional (2D) barcodes, quick response (QR) codes, linear barcodes, or other encoded indicia. The decode barcode data may represent the decoded information encoded in one or more barcodes on the target 38, for example. Further, as a part of image data processing, the app 86 may perform pixel and image smoothing on the image data. Additional processing may include statistical analysis on blocks of image data, such as on the pixel groupings, by performing edge detection identifying indicial or other symbols in the image data, including the bounds of the indicia or symbol and the resolution of the indicia or symbol for sufficiently accurate identification of the indicia and symbol and sufficiently accurate decoding of the indicia or identification of the symbol.

The memory 76 may represent one or more memories and may include one or more forms of volatile and/or non-volatile, fixed and/or removable memory, such as read-only memory (ROM), electronic programmable read-only memory (EPROM), random access memory (RAM), erasable electronic programmable read-only memory (EE-PROM), and/or other hard drives, flash memory, MicroSD cards, and others. In general, a computer program or computer based product, application, or code (e.g., applications 84 and 86 and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the host processor 36 (e.g., working in connection with the respective operating system in the memory 76) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The host processor 36 may be connected to the memory 76 through a computer bus, such as bus 54, responsible for transmitting electronic data, data packets, or otherwise electronic signals to and from the host processor 36 and the memory 76 in order to implement or perform the machine readable instructions, methods, processes, elements or limitations, as illustrated, depicted, or described for the various flowcharts, illustrations, diagrams, figures, and/or other disclosure herein. The host processor 36 may interface with the memory 76 via the computer bus to create, read, update, delete, or otherwise access or interact with the data stored in the memory 76 and/or external databases (e.g., a relational database, such as Oracle, DB2, MySQL, or a NoSQL based database, such as MongoDB). The data stored in the memory 76 and/or an external database may include all or part of any of the data or information described herein, including, for example, image data from images captures by the imager 24, encoded image data from the ASIC 50, etc.

The example processing platform 300 further includes a networking interface 326 to enable communication with other imaging devices (e.g., barcode imaging devices or machine vision devices) via, for example, one or more networks. The example networking interface 326 includes any suitable type of communication interface(s) (e.g., wired and/or wireless interfaces) configured to operate in accordance with any suitable protocol(s) (e.g., Ethernet for wired communications and/or IEEE 802.11 for wireless communications). The example processing platform 300 also includes input/output (I/O) interfaces 328 to enable receipt of user input and communication of output data to the user. Such user input and communication may include, for example, any number of keyboards, mice, USB drives, optical drives, screens, touchscreens, etc.

Figure 4:
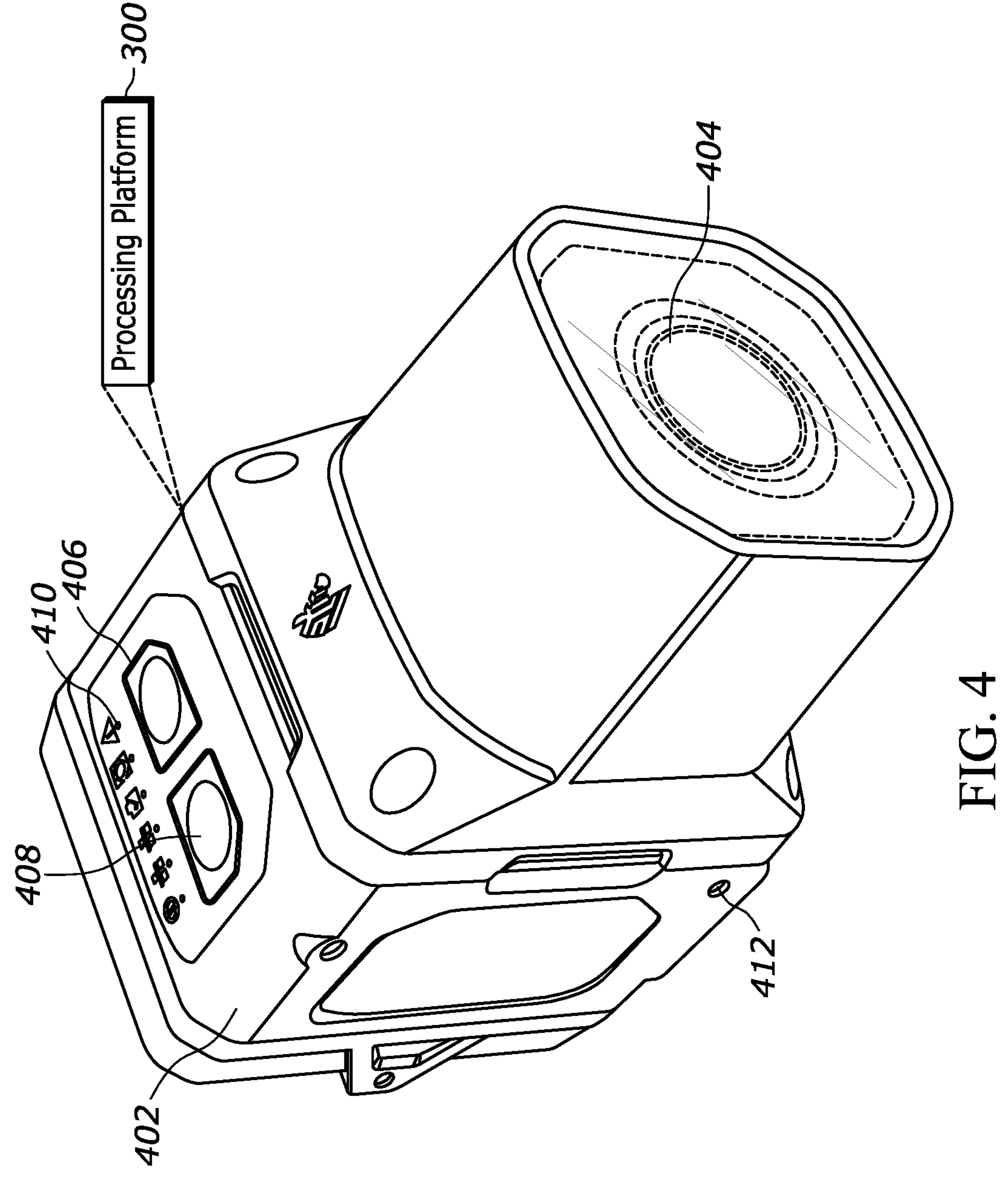
FIG. 4 is a perspective view of an imaging device in the form of a machine vision device, in accordance with embodiments described herein.

FIG. 4 is a perspective view of another example imaging device 400, in accordance with embodiments described herein, in order to implement or perform the machine readable instructions, methods, processes, elements or limitations, as illustrated, depicted, or described for the various flowcharts, illustrations, diagrams, figures, and/or other disclosure herein. The imaging device 200 is implemented as a machine vision device, for example, as may be implemented in production/manufacturing environments for visual inspections that take place in order for the production/manufacturing to proceed. The imaging device 400 includes a housing 402, an imaging aperture 404, a user interface label 406, a dome switch/button 408, one or more light emitting diodes (LEDs) 410, and mounting point(s) 412. The imaging device 400 includes an imager (not shown), which may be color imager or a grayscale imager. The imaging device 400 may automatically and/or in response to instructions received from an external device and/or a user computing device, initiate an application to allow a user to configure and/or execute a machine vision job and/or configure imaging settings of the imaging device 400. Of course, the imaging device 400 may independently adjust the imaging settings in response to the determinations made as part of the execution of the imaging application. The imaging device 200 includes the processing platform 300, in particular, so that the ASIC 50 determines image metadata for each of a plurality of pixel groupings and encodes the image data with image metadata words before sending the encoded image data to the host processor 36 for processing, in accordance with processes herein.

Figure 5:
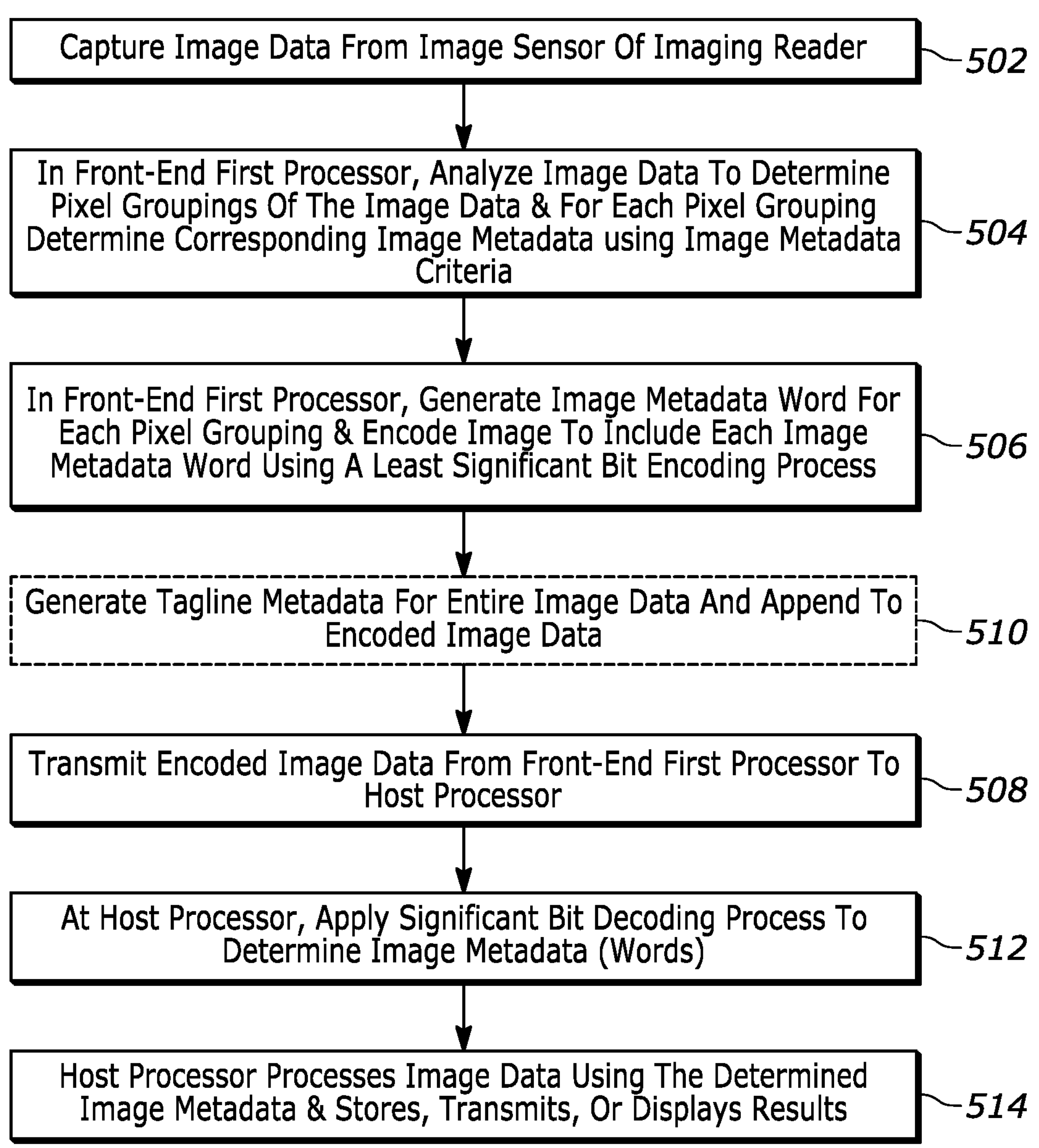
FIG. 5 is a flowchart representative of a method for encoding image metadata into image data using a least significant bit encoding process and sending that encoded image data to a host process for processing, in accordance with embodiments described herein.

FIG. 5 is a flowchart representative of a method 500 for encoding image metadata in image data captured by an imaging device, in accordance with embodiments described herein. Generally, and as mentioned above, the method 300 for encoding image metadata on imaging devices takes captured image data, analyzes that data to determine image metadata, and embeds that image metadata into the image data using a steganographic process before the image data is sent to a host processor for image processing. More specifically, the method 300 allows an imaging device to more quickly performing image processing operations such as barcode decoding or machine vision processes, depending on the applications of use.

Figure 6A:
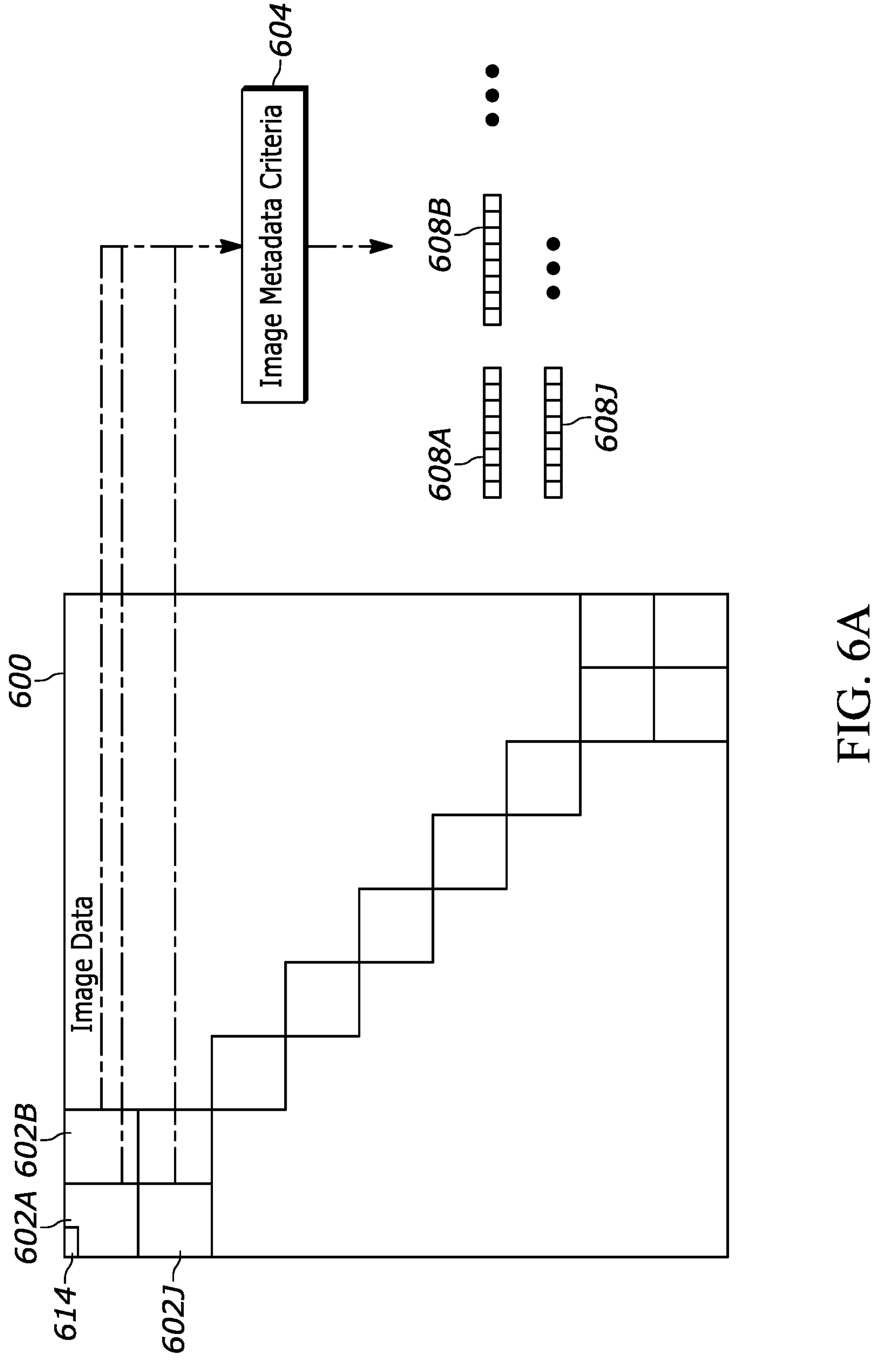
FIG. 6A depicts an example implementation of processes in the method of FIG. 5, for determining image metadata words for different pixel groupings in image data, in accordance with embodiments described herein.

At block 502, the method 500 includes capturing, by an imager of the imaging device, an image of an environment in field of view of the image generating image data, for example, the image data 600 shown in FIG. 6A. At block 504, the method 500 includes at a first processor, such as an imaging device processor (e.g., front-end ASIC 50), analyzing the image data and determining pixel groupings of the image data, for example, pixel groupings 602A, 602B, 602J, . . . , etc. in FIG. 6A. For example, the block 504, which may be implemented by a pixel grouping generator in a first processor, may be configured to generate pixel groupings of N pixel×N pixel squares, where N is great than 1, for example, 2 pixel×2 pixel squares, 4 pixel×4 pixel squares, 8 pixel×8 pixel squares, or larger. For each pixel grouping, the block 504 analyzes the pixels in the grouping using an image metadata criteria 604 to determine image metadata for that grouping. This determination is in contrast to separate metadata that may be determined for the entire image data, as a whole. In various embodiments, that image metadata criteria 604 may be instructions for the block 504 to determine from the pixel grouping maximum pixel intensity data over the respective pixel grouping, minimum pixel intensity data over the respective pixel grouping, pixel intensity range data over the respective pixel grouping, directional pixel data over the respective pixel grouping, or any combination thereof. These operations of the block 504 may be performed by the processing encoder application 80, for example, At block 506, and as may be performed by the processing encoder application 80, for example, the method 500 may generate image metadata words 608A, 608B, 608J, . . . , etc. representing the image metadata for a corresponding pixel grouping, 602A, 602B, 602J, . . . , etc. If the image data is a grayscale image data, then the block 506 may generate a single channel word, e.g., a single 8 bit (1 byte) word. If the image data is color image data, the block 506 may generate a multi-channel word, for example, a multi-channel word might have an 8 bit word for a red (R) pixel channel, another 8 bit word for a blue (B) channel, and another 8 bit word for green (G) channel. In some examples, a further channel may be included for overall pixel intensity, for example.

Figure 6B:
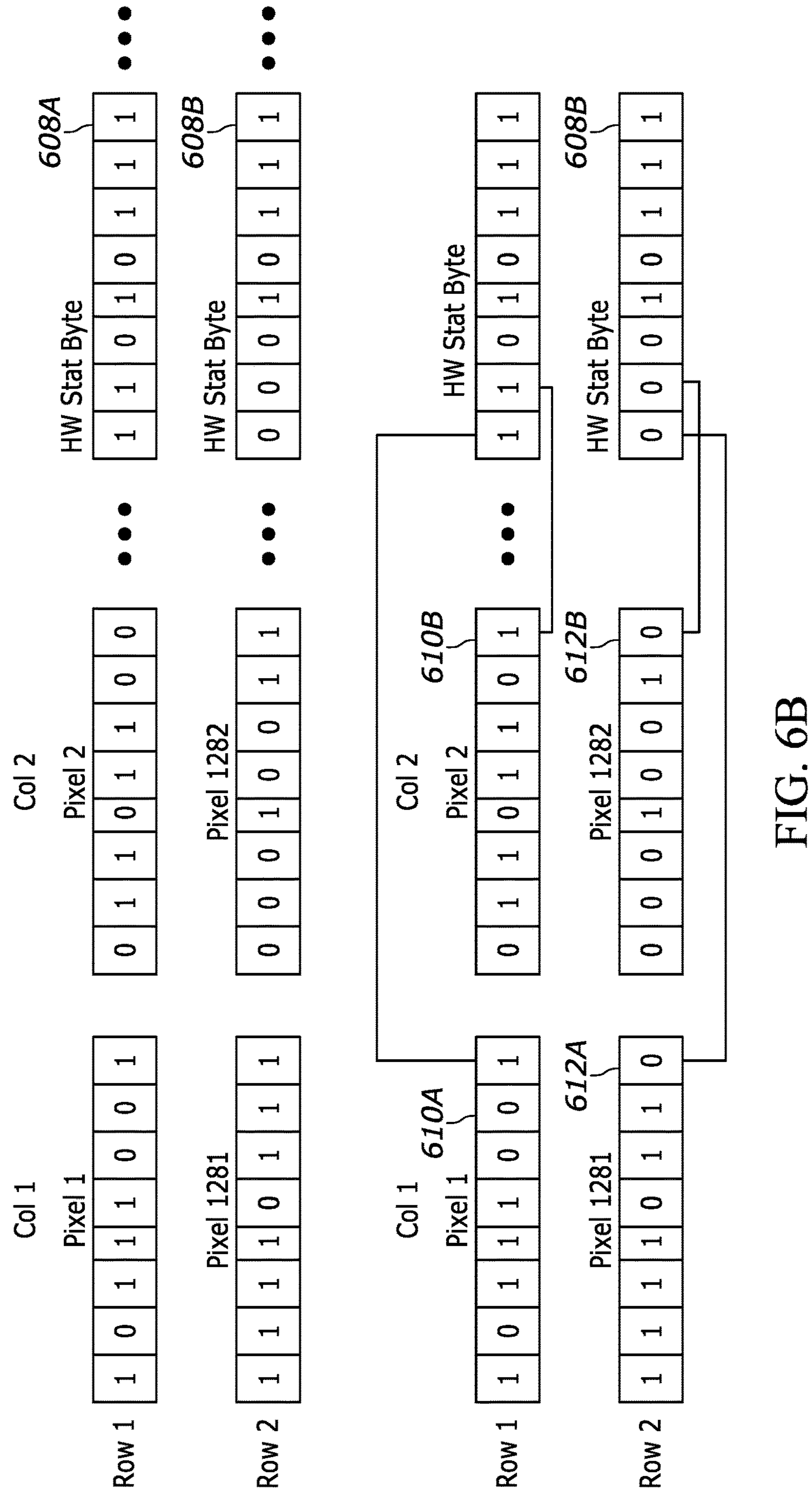
FIG. 6B is an example implementation of least significant bit encoding and decoding as may be performed in the method of FIG. 5, in accordance with embodiments described herein.

To encode the image metadata words, at the block 506, the method 500 applies a steganographic process that encodes the image metadata words into pixel data of the image data, an example of which is shown in FIG. 6B. In various embodiments, at the block 506 the method applies a least significant bit encoder for this process. For example, as shown in FIG. 6B, the image data 600 includes pixel data

610A, 610B, . . . , 612A, 612B, . . . , in the form of an 8 bit (1 byte) word the provides the pixel intensity for each corresponding pixel of the array of pixels forming the imager. FIG. 6B illustrates an example implementation of the block 506, which may be an example implementation of the processing encoder 80, in which each bit of an image metadata word is stored in a least significant bit of the pixel data. In the illustrated example, each of the 8 bits of the image metadata word 608A would be stored in the least significant bit locations of 8 different pixel data, 610A, 610B, . . . , 610H for 8 different adjacent pixels in a first row of the imager array. Similarly, each of the 8 bits of the image metadata word 608B would be stored the least significant bit locations of 8 different pixel data, 612A, 612B, . . . , 612H for 8 different adjacent pixels in a first row of the imager array. In various embodiments, the method 500 overwrites the initial least significant bit of the pixel data and replaces that value with the value of the corresponding bit of the image metadata word.

In some embodiments, the block 506 inserts an encode flag into the image data, for example, by setting a first few bits of an upper left pixel data 614 to a data value that indicates the image data has been encoded with image metadata. Because the block 506 uses a steganographic process, such as a least significant bit process, merely analyzing the encoded image data may not indicate that the image data has been encoded, without using a complex decoding scheme.

At block 508, the method 500 transmits the encoded image data to the second processor, such as host processor. Optionally, in some embodiments, an optional block 510 is included in the method 500, such that before transmitting the encoded image data, as part of the method 500, the first processor analyzes the entire image data, as opposed to pixel groupings, and determines tagline metadata for the entire image data. Tagline metadata is metadata that defines conditions of the entire image, such as generally where a barcode is likely to preside in an image. The optional block 510 appends this tagline metadata to the end of the image data, either at unused (i.e., zero or blank) rows of pixel data or after the last row of pixel data, thereby increasing the file size of the image data.

At the block 512, the host processor applies a steganographic decoding process to the received encoded image data, in particular, a least significant bit decoding process. In the example of FIG. 6B, the host processor reads each least significant bit of the pixel data and reconstructs each of the image metadata words collectively forming the image metadata. In some embodiments, at the block 512, the host processor first examines the received image data to detect the presence of an the encode flag data, such as at a first position 614 of the image data. If the host processor detects the encode flat data, then the host processes recognizes the received image data is encoded image data and the host processor will apply the steganographic decoding process, otherwise, the host processor may process the image data using conventional techniques, without the benefit of image metadata, such as from using only the tagline metadata or through brute force.

At the block 514, the method 500 then processes the image data using the image metadata words. For example, the host processor may use the image metadata to more efficiently process particular pixels data during image data processing. In some embodiments, the processing of block 514 may identify indicia in the image data and decoding that indicia to generate decode data corresponding to the indicia. In some embodiments, the processing of block 514 may identify one or more objects, one or more object defects, contrast data, brightness data, pixel count, or a combination thereof. At the block 514, the host processor may store, transmit, or display the results of that image processing.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for encoding image metadata in image data, the method comprising:

capturing, by an imaging device, image data corresponding to an image of environment captured over a field of view of the imaging device;

analyzing, on an imaging device processor of the imaging device, the image data and determining, on the imaging device processor, image metadata of a plurality of pixel groupings over the captured image, the image metadata comprising a plurality of image metadata words each representing image metadata for a different pixel grouping;

encoding, on the imaging device processor, each of the image metadata words into least significant bits of pixel data in the image data to generate an encoded image data; and transmitting the encoded image data, from the imaging device processor to a host processor, the host processor applying a least significant bit decoding process to decode the image metadata, the host processor further using that image metadata to process the image data;

wherein generating the encoded image data includes converting raw image data captured by the imaging device to a reduced resolution rendition of the raw image data and encoding the reduced resolution rendition of the raw image data with the image metadata words.

2. The method of claim 1, further comprising in the host processor device, identifying indicia in the image data and, using the image metadata, decoding the indicia and generating decode data corresponding to the indicia.

3. The method of claim 1, further comprising in the host processor device, using the image metadata, identifying in the image data one or more objects, one or more object defects, contrast data, brightness data, pixel count, or a combination thereof.

4. The method of claim 1, wherein the image metadata determined at the imaging device processor is maximum pixel intensity data over the respective pixel grouping, minimum pixel intensity data over the respective pixel grouping, pixel intensity range data over the respective pixel grouping, directional pixel data over the respective pixel grouping, or any combination thereof.

5. The method of claim 1, wherein the pixel groupings are 8 pixel by 8 pixel groupings in size or larger.

6. The method of claim 1, wherein the imaging device comprises a grayscale imager and the image data is grayscale image data and the image metadata words are single channel words.

7. The method of claim 1, wherein the imaging device comprises a color imager and the image data is color image data and the image metadata words are multiple channel words.

8. The method of claim 1, further comprising:

analyzing, on the imaging device processor of the imaging device, the captured image and determining, on the imaging device processor, tagline metadata for the entire image data; and appending, at the imaging device processor, the tagline metadata after the image data, to form an encoded image data appended with the tagline metadata.

9. The method of claim 1, further comprising:

adding, at the imaging device processor, encode flag data to the image data such that the encoded image data contains the encode flag data; and the host processor selectively decoding the image metadata in response to detecting the encode flag data.

10. A device for encoding image metadata into image data captured by an imaging device, the device comprising:

an imaging device processor and a second processor operatively coupled to the imaging device processor through a communication link; and a non-transitory computer-readable memory coupled to the imaging apparatus and the first or second processors, the memory storing instructions thereon that, when executed by the first and second processors, cause the first and second processors to:

capture, by an imaging device, image data corresponding to an image of scene captured over a field of view of the imaging device;

analyze, on the imaging device processor, the image data and determine, on the imaging device processor, image metadata of a plurality of pixel groupings over the captured image, the image metadata comprising a plurality of image metadata words each representing image metadata for a different pixel grouping;

encode, on the imaging device processor, each of the image metadata words into least significant bits of pixel data in the image data to generate an encoded image data;

transmit the encoded image data, from the first process to the second processor;

apply, at the second processor, a least significant bit decoding process to decode the image metadata; and at the second processor, process the image data, using the decoded image metadata;

wherein generating the encoded image data includes converting raw image data captured by the imaging device to a reduced resolution rendition of the raw image data and encoding the reduced resolution rendition of the raw image data with the image metadata words.

11. The device of claim 10, wherein the second processor is a host processor is configured to identify indicia in the image data and decoded the indicia and generate decode data corresponding to the indicia, identify in the image data one or more objects, identify in the image data one or more object defects, determine contrast data, determine brightness data, determine pixel count, or a combination thereof.

12. The device of claim 10, wherein the image metadata determined at the imaging device processor is maximum pixel intensity data over the respective pixel grouping, minimum pixel intensity data over the respective pixel grouping, pixel intensity range data over the respective pixel grouping, directional pixel data over the respective pixel grouping, or any combination thereof.

13. The device of claim 10, wherein the pixel groupings are 8 pixel by 8 pixel groupings in size or larger.

14. The device of claim 10, wherein the imaging device comprises a grayscale imager and the image data is grayscale image data and the image metadata words are single channel words.

15. The device of claim 10, wherein the imaging device comprises a color imager and the image data is color image data and the image metadata words are multiple channel words.

16. The device of claim 10, the non-transitory computer-readable memory storing further instructions thereon that, when executed by the first and second processors, cause the first and second processors to:

analyze, on the imaging device processor, the image data and determine, on the imaging device processor, tagline metadata for the entire image data; and append, on the imaging device processor, the tagline metadata after all the pixel data of the image data, to form an encoded image data appended with the tagline metadata.

17. The device of claim 10, the non-transitory computer-readable memory storing further instructions thereon that, when executed by the first and second processors, cause the first and second processors to:

add, on the imaging device processor, encode flag data to the image data such that the encoded image data contains the encode flag data; and at the second processor, selectively decode the image metadata in response to detecting the encode flag data.

18. A system for encoding image metadata into image data, the device comprising, the system comprising:

an imaging device configured to capture image data over a field of view of an imager; and an imaging device processor at a front end of the imaging device and communicatively coupled to a host processor through a communication link, wherein the imaging device processor is configured to:

analyze the image data and determine image metadata of a plurality of pixel groupings over the image data, the image metadata comprising a plurality of image metadata words each representing image metadata for a different pixel grouping;

encode each of the image metadata words into least significant bits of pixel data in the image data to generate an encoded image data; and transmit the encoded image data to the host processor over the communication link; and wherein the host processor is configured to:

apply a least significant bit decoding process and decode the image metadata; and process the image data using the decoded image metadata;

wherein generating the encoded image data includes converting raw image data captured by the imaging device to a reduced resolution rendition of the raw image data and encoding the reduced resolution rendition of the raw image data with the image metadata words.

19. The system of claim 18, wherein the host processor is configured to identify indicia in the image data and decoded the indicia and generate decode data corresponding to the indicia, identify in the image data one or more objects, identify in the image data one or more object defects, determine contrast data, determine brightness data, determine pixel count, or a combination thereof.

20. The system of claim 18, wherein the image metadata determined at the imaging device processor is maximum pixel intensity data over the respective pixel grouping, minimum pixel intensity data over the respective pixel grouping, pixel intensity range data over the respective pixel grouping, directional pixel data over the respective pixel grouping, or any combination thereof.

21. The system of claim 18, wherein the pixel groupings are 8 pixel by 8 pixel groupings in size or larger.

22. The system of claim 18, wherein the imaging device comprises a grayscale imager and the image data is grayscale image data and the image metadata words are single channel words.

23. The system of claim 18, wherein the imaging device comprises a color imager and the image data is color image data and the image metadata words are multiple channel words.

24. The system of claim 18, wherein the imaging device processor is configured to:

analyze the image data and determine tagline metadata for the entire image data; and append the tagline metadata after the all pixel data of the image data, to form an encoded image data appended with the tagline metadata.

25. The system of claim 18, wherein the imaging device processor is configured to add encode flag data to the image data such that the encoded image data contains the encode flag data; and wherein the host processor is configured to selectively decode the image metadata in response to detecting the encode flag data.

* * * * *